US006833866B1

(12) United States Patent
Suzuki

(10) Patent No.: US 6,833,866 B1
(45) Date of Patent: Dec. 21, 2004

(54) IMAGE RECORDING DEVICE AND ELECTRONIC CAMERA DEVICE USING DIFFERENT RECORDING METHODS FOR DIFFERENT IMAGE COMPRESSION ENCODING METHODS

(75) Inventor: Takeshi Suzuki, Akiruno (JP)

(73) Assignee: Olympus Corporation (JP)

( * ) Notice: Subject to any disclaimer, the term of this patent is extended or adjusted under 35 U.S.C. 154(b) by 0 days.

(21) Appl. No.: 09/546,789

(22) Filed: Apr. 11, 2000

(30) Foreign Application Priority Data

Apr. 12, 1999 (JP) .......................... 11-103889

(51) Int. Cl.[7] .......................... H04N 5/76; H04N 5/225
(52) U.S. Cl. .................... 348/231.2; 348/372
(58) Field of Search .................. 348/231.99, 231.2, 348/231.3, 372, 397.1, 398.1; 382/240, 302; 386/109

(56) References Cited

U.S. PATENT DOCUMENTS 5,381,145 A * 1/1995 Allen et al. ................. 341/107
5,527,630 A * 6/1996 Nagata et al. ................. 429/7
5,606,543 A * 2/1997 Sugiyama ............... 369/124.09
5,710,835 A * 1/1998 Bradley ....................... 382/233
5,953,460 A * 9/1999 Wu .............................. 382/239
5,963,255 A * 10/1999 Anderson et al. ........... 348/372
6,031,999 A * 2/2000 Ogawa ........................ 396/303
6,067,383 A * 5/2000 Taniguchi et al. .......... 382/240
6,201,897 B1 * 3/2001 Nixon ......................... 382/248
6,236,762 B1 * 5/2001 Chui et al. .................. 382/250
6,430,354 B1 * 8/2002 Watanabe .................... 386/46
6,434,337 B1 * 8/2002 Misawa ....................... 396/279
6,553,147 B2 * 4/2003 Chai et al. .................. 382/240
6,681,051 B1 * 1/2004 Hoppe et al. ............... 382/240
2004/0062446 A1 * 4/2004 Katayama ................... 382/239

FOREIGN PATENT DOCUMENTS

JP          7-143443      6/1995
JP       2001103484 A  *  4/2001   ............ H04N/7/30

* cited by examiner

Primary Examiner—Tuan Ho
Assistant Examiner—Timothy J. Henn
(74) Attorney, Agent, or Firm—Straub & Pokotylo; John C. Pokotylo

(57) ABSTRACT

An image recording device has an encoding part to hierarchically encode an image data, and a record part which repeatedly records the image data, which is hierarchically encoded, on a record medium while fixing it for each cluster of the predetermined unit as a file.

34 Claims, 8 Drawing Sheets

IMAGE RECORDING DEVICE AND ELECTRONIC CAMERA DEVICE USING DIFFERENT RECORDING METHODS FOR DIFFERENT IMAGE COMPRESSION ENCODING METHODS

This application is based upon and claims the benefit of priority from the prior Japanese Patent Application No. 11-103889, filed Apr. 12, 1999, the entire contents of which are incorporated herein by reference.

BACKGROUND OF THE INVENTION

The present invention relates to an image recording device which records image data on a record medium and to electronic camera devices in which the image recording device is used.

In general, in electronic cameras, the image data of the subject that is obtained by photographically shooting the subject is recorded as a file on a record medium such as a memory card(s). Since the memory capacity of the record medium is limited, the image data is usually recorded after compression, thus increasing the number of photographic shots that may be performed with the electronic camera before the recording medium is full over the number of photographic shots that could have been performed if compression was not used. Currently image compression methods mainly use the DCT (Discrete Cosine Transform) method. For example, JPEG (Joint Photographic Coding Experts Group) is such an image compression method using DCT. The entire image may be divided into small blocks, such as 8×8 size small blocks, and the DCT method of performing orthogonal transformations for each block may be used. In this method, the amount of data representing the image can be decreased by performing quantization and variable length encoding for every block transformed into the frequency domain by the orthogonal transformation.

Recently, the image compression method of using wavelet transform has begun to gain attention as a new image compression method that can take the place of DCT. The image compression method of using the wavelet transform is a hierarchical encoding method of encoding the image data by dividing each frequency component and obtaining a plurality of image information each with a different resolution as a result. The wavelet transform method can unitedly obtain the image information of a low resolution, a standard resolution, and a high resolution. Since this method is a method of encoding each frequency component, even when all of the frequency components are not used in the encoded data, the image can be restored using only the low resolution image information on the low frequency side whose frequency component is low. In other words, the amount of data can be reduced by ignoring the high resolution image information on the high frequency side. The image compression method of using the wavelet transform, also has merit in that the block noise and the Mosquito noise characteristics can be decreased compared with the image compression method using DCT. The image compression method of using such a wavelet transform is currently planned for use in the JPEG 2000 standard, and early use of the planned JPEG 2000 standard is hoped for in electronic cameras.

However, the writing sequence of the image data used with a conventional electronic camera is not sufficient to make the best use of the characteristic of the image compression method of using the wavelet transform. The reasons are as follows.

The compressed image data is conventionally recorded on the record medium as a file in the following writing order.

(1) All the compressed image data is written.

(2) The file allocation table (FAT) used to manage the linkage of data for the management data unit, which is called a cluster, is updated.

(3) Writing to directory entry, which is file management information of recorded image data, is performed and the recorded image data is fixed to be able to be used as a file. In this specification, to "fix" means to be able to use recorded image data as the file as mentioned-above.

As described above, the reason why the directory entry is written at the end and the file is fixed is to prevent useless data from remaining as a file if writing is interrupted by, for example, death of the battery during the writing of the image data. In a case of the image compression method using DCT, since the original image cannot be restored if all the encoded data is not recorded and available, there is no disadvantage in using this conventional writing method. However, when a hierarchical encoding method such as the wavelet transform is used, there is a possibility that valid encoded data, which has completed writing, will be lost and inaccessible if the conventional writing method is used. That is, since the image compression method by using the hierarchical encoding method such as the wavelet transform encodes each image frequency, the original image could be restored to some degree using only the encoded data of the lower frequency side even if all the encoded data has not been completely recorded, provided other writing methods were employed.

BRIEF SUMMARY OF THE INVENTION

An object of the present invention is to provide an optimal image recording device and an electronic camera device including the image recording device which records image data which is hierarchically encoded, validates, and uses written data as a file even when the writing operation is interrupted by the death of the battery before the entire writing data is completed.

An image recording device of the present invention is characterized by comprising encoding means to hierarchically encode image data; and record means which repeatedly records the image data, which is hierarchically encoded, on a record medium while fixing it for each cluster of a predetermined unit as a file.

The image data, which is hierarchically encoded, is recorded while fixing it as a file for each predetermined cluster. Therefore, even when the writing operation is interrupted while writing by the death of the battery, it becomes possible to leave the already written data as a useful file. It then becomes possible to restore the original image using only the fixed encoded data although the picture quality becomes lower than would have been possible if the writing had not been interrupted.

When two or more types of the encoding methods are available in the same device, it is desirable to be able to switch between them and to execute a writing method of image data advantageous according to the used encoding method. In such a case, the recording is repeatedly performed while fixing the file by the predetermined cluster unit when image data, which is hierarchically encoded, is recorded; in contrast all the encoded image data are fixed as a file and are recorded on the record medium when the image data, encoded by other encoding methods except a hierarchical encoding method, is recorded.

As a result, when the image data is hierarchically encoded, even if the writing operation is interrupted while performing the writing operation, the data which has been recorded can be left as a usable file about image data. When the image data is encoded by other encoding methods and the writing operation is interrupted, it becomes possible to prevent the defective data which cannot be reproduced from remaining as a file about the image data.

Since the disadvantage because of the death of the battery is less significant by using the above-mentioned writing method for image data, which is hierarchically encoded, it is desirable to change the threshold level to detect whether the battery is consumed and the execution timing of the detection operation according to the encoding method used. Thus, by buffering the detection condition concerning the battery consumption when a hierarchical encoding method is used, a useless warning signal can be prevented from being generated when a hierarchical encoding method is used. When other encoding methods are used, it becomes possible beforehand to prevent the problem of the interruption of writing the encoded image data, from occurring by heeding the warning signal.

The present invention can be applied also to the electronic camera which comprises the above-mentioned image recording device, and, furthermore, can be achieved as a recording medium to be able to execute the function of the above-mentioned image recording device with an executable computer.

According to the present invention, even when the writing operation of image data, which is hierarchically encoded, is interrupted by the death of the battery prior to writing all data, it becomes possible to validly use the data which has been recorded thus far as a file.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
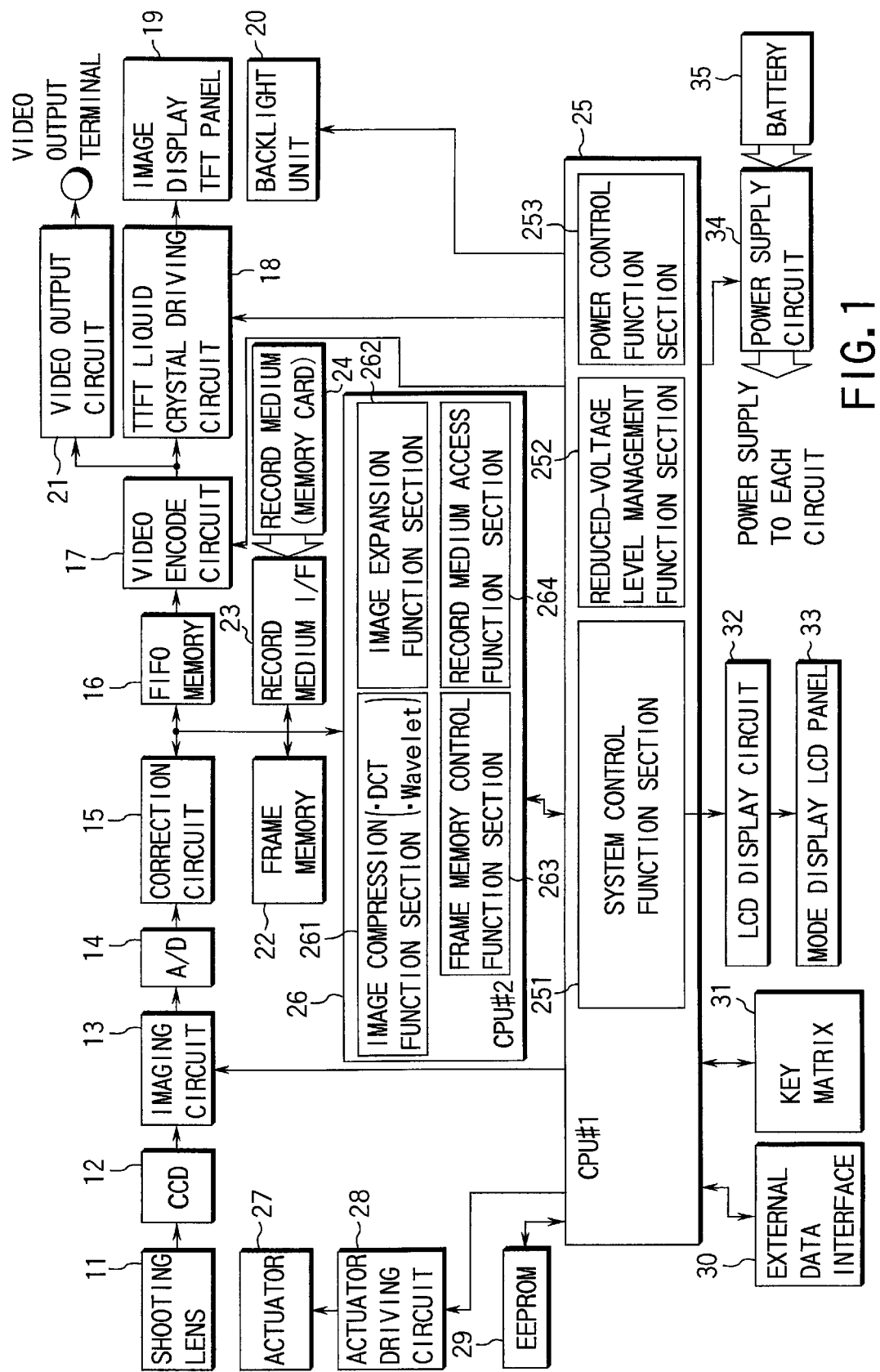
FIG. 1 is a block diagram which shows the system configuration of the electronic camera according to the embodiment of the present invention.

Hereafter, the embodiment of the present invention will be explained referring to the drawing. FIG. 1 shows the configuration of the electronic camera according to the embodiment of the present invention.

This electronic camera is a digital still camera which shoots the subject image by using the solid-state imaging element such as CCD, and compresses and records the obtained image data by the shooting on the record medium, and has two types of image compression functions of the image compression method of using DCT and the image compression method of using the wavelet transform. The image compression methods to be used can be switched according to the type of the image record mode specified, for example, by the user.

An electronic camera according to the embodiment comprises lens section 11, CCD area sensor 12, imaging circuit 13, A/D conversion circuit 14, correction circuit 15, FIFO memory 16, video encode circuit 17, TFT liquid crystal driving circuit 18, image display TFT panel 19, backlight unit 20, video output circuit 21, frame memory 22, record medium interface (I/F) 23, record medium 24, first and second CPUs 25 and 26, actuator 27, actuator driving circuit 28, EEPROM 29, external data interface (I/F) 30, key matrix 31, LCD display circuit 32, mode display LCD panel 33, power supply circuit 34, and battery 35 as shown in the figure.

Lens section 11 constructs shooting optical system, and images the subject image on the imaging surface of CCD area sensor 12. The subject image imaged on the imaging surface of CCD area sensor 12 is photo-electrically converted with CCD area sensor 12, and is converted into an electric image signal. This image signal is sent to A/D conversion circuit 14 through imaging circuit 13 to control the imaging operation of CCD area sensor 12, and converted into digital image data. After the color correction and the gamma correction, etc. for the white balance control are performed by correction circuit 15, this image data is stored in frame memory 22.

Frame memory 22 is a memory to temporarily hold the image data taken from CCD area sensor 12 and the image data of the reproduction target read from record medium 24, and is used as a work memory area for various image processing including the image compression and the expansion processing, etc.

FIFO memory 16, video encode circuit 17, TFT liquid crystal driving circuit 18, image display TFT panel 19, backlight unit 20, and video output circuit 21 function as the monitor display circuit. The monitor display circuit displays the image data of the subject image taken from CCD area sensor 12 on TFT panel 19 and the image display external TV monitor as a viewfinder image, and reproduces and displays the image data recorded on record medium 24 on TFT panel 19 and the image display external TV monitor. The image data of the display target recorded in frame memory 22 is sent to video encode circuit 17 through FIFO memory 16, and, then, converted into a video signal such as NTSC. Thereafter, image data is sent to TFT liquid crystal driving circuit 18 and video output circuit 21. TFT liquid crystal driving circuit 18 drives and controls Image display TFT panel 19 according to the input video signal, and displays the image data to be displayed on the TFT panel 19. Video output circuit 21 outputs the input video signal to the external TV monitor connected with the video signal output terminal if necessary.

Record medium interface (I/F) 23 is an interface to perform read/write access to record medium 24 detachably installed to the main body of the electronic camera. The memory card, etc. which use flash EEPROM are used as record medium. This record medium 24 is treated as a semiconductor memory device to take the interchangeability of the file between other electronic equipment such as personal computers. The data recorded on record medium 24 is managed as a file by the file system such as the FAT file system.

First CPU (CPU #1) 25 controls the operation of each unit which constructs this electronic camera, and is achieved by using one chip microcomputer etc. This first CPU (CPU #1) 25 has system control function section 251, reduced-voltage level management function section 252, and power control function section 253, etc. These function sections have been achieved by the software programs executed, respectively, by first CPU (CPU #1) 25.

System control function section 251 controls the entire operation of the electronic camera, and, when various operation switches (release switch and mode switch, etc.), which construct key matrix 31, are operated by the user, performs the control of the shooting operation, the control for the reproduction display of the record image, and the switch control etc. of the record mode according to the operation.

When the user slightly pushes the release switch (first release operation) by using the release switch at shooting operation, system control function section 251 controls actuator driving circuit 28 to perform the rotation control of the motor of actuator 27, and after adjusting the position of lens 11 at the focusing point position (AF control operation) fixes the position of lens 11 to the focusing point position (AF lock). Under such a condition, when the release switch is further pushed (second release operation), system control function section 251 controls imaging circuit 13, to execute this shooting operation with CCD area sensor 13, and takes image data from the CCD area sensor 13.

In the embodiment, it will be explained assuming that "DCT compression mode" and "Wavelet transform compression mode" are prepared as "record mode" to record the image data obtained by this shooting operation in record medium 24.

"DCT compression mode" is a mode which compresses the image data obtained by shooting by the image compression method using DCT and records it on record medium 24, and is used when recording by compressing image data by a usual JPEG form. "Wavelet transform compression mode" is a mode, which compresses the image data obtained by shooting by the image compression method of using the above-mentioned wavelet transform, and records it on record medium 24. This "Wavelet transform compression mode" is used when image data is recorded by the JPEG 2000 form.

When "DCT compression mode" is used, the original image cannot be restored if all the encoded data does not become complete as a property. On the other hand, since "Wavelet transform compression mode" is an encoded hierarchical encoding method which divides image data into the plurality of frequencies and encodes image for each frequency, even if all data has not been recorded, the original image can be restored using only the data of a low resolution on the low frequency side. In considering the difference of such a characteristic, in the embodiment, a different writing sequence in "DCT compression model" and "Wavelet transform compression mode" is used. Here, the principle of the writing sequence used in the embodiment will be explained.

When "DCT compression mode" is used, writing is performed according to the following procedures to prevent the useless data which cannot be restored from remaining in record medium 24 as a file, even when the writing operation is interrupted while writing by the death of the battery.

(1) All the compressed image data is written.

(2) File management table (FAT) to manage the linkage of data for the management data unit which is called a cluster is updated.

(3) Writing to directory entry, which is file management information on recorded image data, is performed, and the recorded image data is fixed so that it can be used as a file.

On the other hand, when "Wavelet transform compression mode" is used, in considering the feature of "Wavelet transform compression mode" which is that original image can be restored using only the data of the low frequency side even if all data has not been completely recorded, writing is performed according to the following procedure.

(1) Writing to directory entry.

(2) Data writing for one cluster.

(3) Updating of FAT.

(4) Repetition of (2) to (3).

As described above, the file is fixed first by writing the directory entry which is file management information on the image data to be recorded, and, by repeatedly executing writing image data and updating FAT every one cluster which is the minimum management unit with file management table (FAT), usable data as a file increases while being fixed every one cluster. Therefore, even if the writing operation is interrupted while writing by the death of the battery of battery 35, leaving the data, which has been recorded, as a file becomes possible, and though the picture quality lowers, the restoration of original image using only the fixed data becomes possible.

Specific operation of these writing sequences will be explained in FIG. 5 or later.

To judge if battery 35 is in a consumption state (hereinafter, also called as "reduced-voltage state"), reduced-voltage level management function section 252 manages that the predetermined threshold level (Hereafter, it is called, "Reduced-voltage threshold level") to compare with the remaining capacity of battery 25. The value of reduced-voltage threshold level is variably set according to "Record mode". That is, as mentioned above, in "Wavelet transform compression mode", even if the writing operation is interrupted by the death of the battery while writing, the fixed data can be left. Therefore, reduced-voltage threshold level for "Wavelet transform compression mode" is set to a lower value than that of "DCT compression mode".

Power control function section 253 controls turning-on/turning-off of the power supply of the electronic camera. That is, after giving the predetermined warning signal, power control function section 253 turns off the power of the electronic camera when it is detected that battery 35 is in the reduced-voltage state. The warning signal is used as a signal of the warning display processing which notifies the user that it is in a state of the reduced-voltage. The warning signal is also used as a signal which stops the operation of the electronic camera and forcibly turns off the power of the electronic camera.

The second CPU (CPU #2) 26 executes various image data processing under the control of first CPU (CPU #1) 25, and is achieved by one chip microcomputer etc. The second CPU (CPU #2) 26 has image compression function section 261, image expansion function section 262, frame memory control function section 263, and record medium access function section 264, etc. These function sections are achieved by the software programs executed, respectively, by the second CPU (CPU #2) 26.

Image compression function section 261 compresses the image data obtained by shooting. When "DCT compression mode" is selected, the compression of image data is performed by the image compression method of using DCT. On the other hand, when "Wavelet transform compression mode" is selected, the compression of image data is performed by the image compression method of using the wavelet transform. Image expansion function section 262 performs expansion processing of the image data of the reproduction target read from record medium 24 and corresponds to both DCT compression mode and the wavelet transform compression mode. Compression-expansion processing is executed on frame memory 22.

Record medium access function section 264 manages the image data file on record medium 24 by using the FAT file system, and controls the execution of the writing operation of the image data file to record medium 24, and the read operation of the image data file from record medium 24 according to the instruction from first CPU (CPU #1) 25. In this case, a different writing sequence is used in "DCT compression mode" and "Wavelet transform compression mode" as mentioned above.

The parameters, which become standards of various image processing and the AF/AE controls etc., are stored in EEPROM 29 beforehand. External data interface (I/F) 30 is the interface to communicate with an external personal computer and other electronic equipment, for example, through the communication interfaces such as RS232C and IEEE 1394, and transfers various control information and the image information. Key matrix 31 is an operation switch group, which includes the release switch and the mode switching switch, etc., as mentioned above. Mode display LCD panel 33 is used for displaying the operation mode currently set and displaying warning, which indicates a state of battery 35 of the reduced-voltage, etc. Mode display LCD panel 33 is controlled with LCD display circuit 32 under the control of system control function section 251.

Power supply circuit 34 is a circuit to supply the operation power supply to each unit from battery 35 such as the dry batteries accommodated in the electronic camera.

(Image Compression Method Which Uses Wavelet Transform)

Next, the principle of the image compression method of using the wavelet transform, will be explained referring to FIG. 2A to FIG. 2D.

Figures 2A, 2B, 2C:
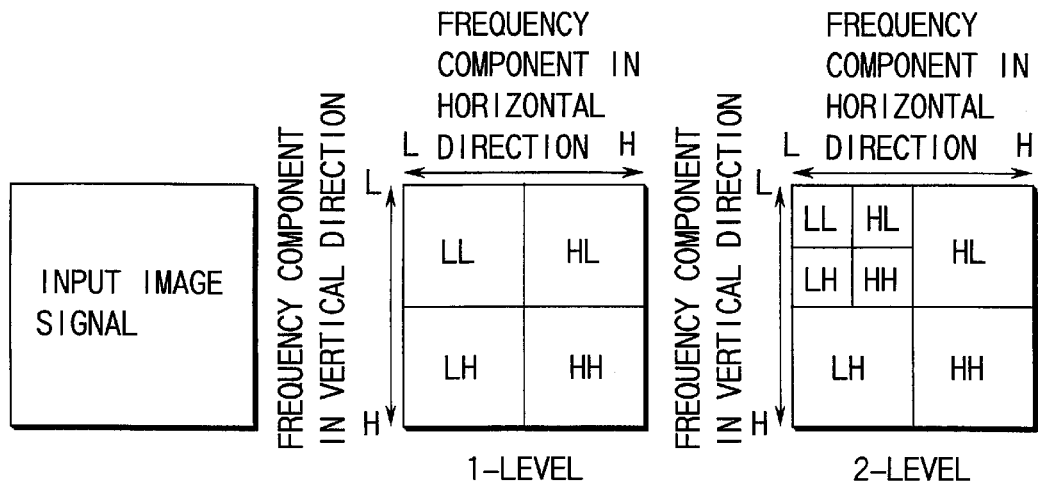
FIG. 2A to FIG. 2D are figures to explain the principle of the image compression method by the wavelet transform compression mode used in the embodiment of the present invention.

In the wavelet transform, the input image signal shown in FIG. 2A is converted into four components as shown in FIG. 2B first by using horizontal and vertical two-dimensional filter banks (LL, HL, LH, HH). LL is a low frequency image component of a low frequency in both of horizontal and vertical directions. HL is called a so-called longitudinal wave component (horizontal difference), and a horizontal frequency component is low, and only the frequency component in the vertical direction is high. LH is called a transverse wave component (vertical difference), and has the low frequency component in the vertical direction, and has high frequency component only in a horizontal direction. HH is called the diagonal wave component (diagonal difference), and is an image component with high frequency in both of the horizontal and vertical direction.

Figure 2D:
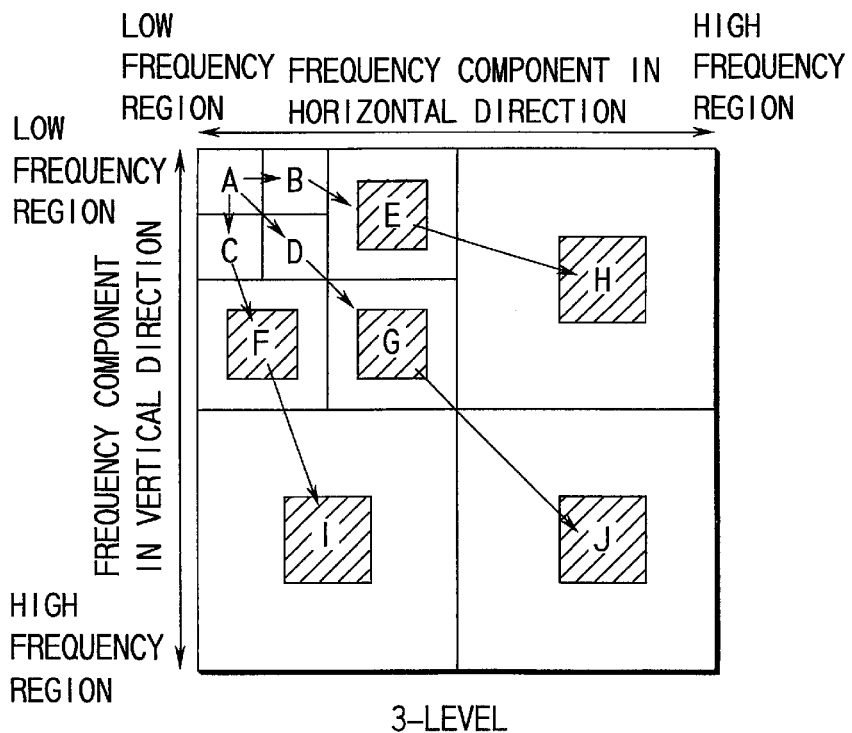

Next, LL component of FIG. 2B is further converted into four components (LL, HL, LH, HH) as shown in FIG. 2C. Thus, by recurrently dividing only low frequency component (LL) until the low frequency image component becomes low resolution such as 64×64 or 32×32, encoded data (A to J) of the hierarchical structure from a low resolution to a high resolution which has the different frequency as shown in FIG. 2D is obtained. Now, encoded data (A) with the lowest frequency component is a basic to restore the image, and this encoded data (A) has the image data component most roughly (low resolution).

For example, if only encoded data (A), which is a basic data, is used, the image of a lowest resolution can be decoded. The resolution of the image, which can be decoded, can be raised by the addition of encoded data (B to J) of the remainder to this image one by one. If all encoded data (A to J) is used, original image can be restored as it is (reversible).

In the hierarchical encoding method of encoding each frequency component like this, even if the encoded data of all the frequency components are not used, the image can be restored only by the encoded data of a low resolution on the low frequency side. Therefore, the amount of data can be reduced by ignoring the encoded data of a high resolution on the high frequency side. On the other hand, if the encoded data of all frequencies are used, reversible compression can be achieved. Even when the encoded data of all frequencies are used, the amount of data can be reduced by performing the variable length encoding method such as Huffman method if necessary.

(Structure of Image Data in Record Medium)

Figure 3:
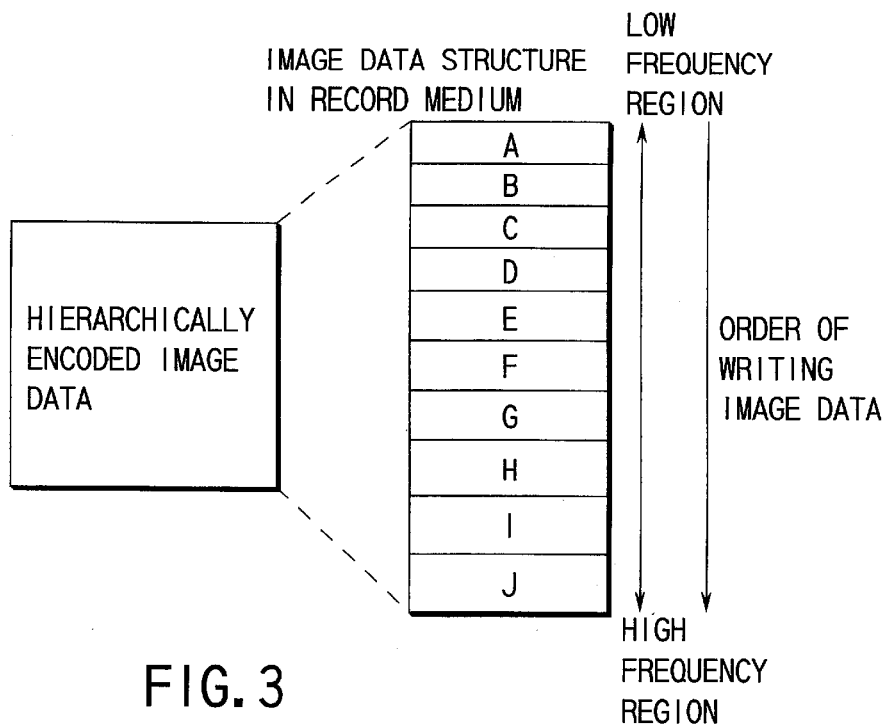
FIG. 3 is a figure which shows the image data structure on the record medium when image data is hierarchically encoded by the wavelet transform compression mode used in the embodiment of the present invention

When image data, which is hierarchically encoded, by the image compression method of using the wavelet transform, is recorded on record medium 24, the image data is recorded from the low resolution image data on the low frequency side sequentially in order of A, B, C, D, and, . . . , J as shown in FIG. 3. Therefore, it becomes possible to leave the low resolution image data on the low frequency side which is basic, even if the writing operation is interrupted by fixing as a file while sequentially recording from the image data of a low resolution on the way.

(File Management Structure of Image Data)

Figure 4:
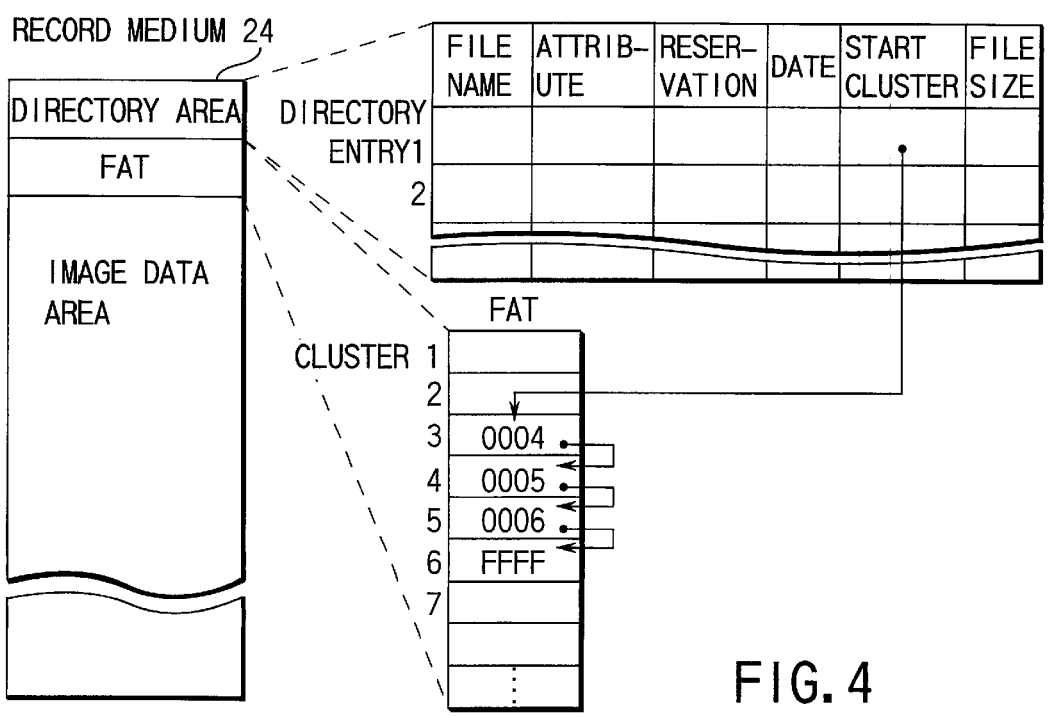
FIG. 4 is a figure to explain the file management structure used, in the embodiment.

The file management structure used in the embodiment is shown in FIG. 4. In the embodiment, to maintain interchangeability with other electronic equipment such as personal computers as mentioned above, image data on record medium 24 is managed as a file by the FAT file system.

In this case, the memory area of record medium 24 is constructed by a file management area which includes the directory area and the FAT area, and the image data area to record actual image data. The directory area is constructed by the directory entry which corresponds to the number of image data files which can be recorded on the image data area. Each directory entry is constructed by file management information (the file name, the file attribute, the file generating date, and leading cluster number of the file and file size, etc.), which corresponds to the image data recorded on the image data area. The leading cluster number shows a leading cluster where the file, which corresponds to image data, is recorded. Here, the cluster is a minimum management data unit to manage logically a physical memory area, and is usually set in the value of the power of two of sectors which become physical data access units (in general, one sector is 512 bytes, and one cluster is 2 kbyte).

FAT is file management table (FAT: File Allocation Table) to manage linkage of the data which constructs the recorded file recorded on the data area by the cluster unit, and the management of the file is performed by this FAT and above-mentioned directory entry. The file of the image data area is constructed that the cluster is as a unit, but a physical position on the disk of the cluster is not always consecutive. Therefore, FAT manages that those clusters are linked in what order to construct one file. Each entry of FAT corresponds to each cluster in the image data area, respectively, and shows the use statement of the corresponding cluster (an empty cluster and cluster at the file end) and the cluster number where the following data are recorded. End code "FFFF", which indicates the end of the file, is written in the entry of FAT corresponding to the cluster where the final data of the file is recorded. Unused code "0000" is written in the entry of FAT corresponding to an unused empty cluster where valid data is not recorded.

(Operation at Shooting: 1)

Next, a series of operations executed with the electronic camera at shooting processing according to the embodiment will be explained referring to the flow chart of FIG. 5.

When second release operation is performed by the user, first CPU (CPU #1) 25 controls the exposure operation with CCD area sensor 12 by using imaging circuit 13 to shoot the subject image (step S11), and continuously reads image data from CCD area sensor 12 by using imaging circuit 13 (step S12). This image data is recorded in frame memory 22 through A/D conversion circuit 14 and correction circuit 15. Next, by first CPU (CPU #1) 25, image compression function section 261 of the second CPU (CPU #2) 26 executes the image compression processing by the wavelet transform, to hierarchically encode image data on frame memory 22 according to the frequency (step S13). Thereafter, first CPU (CPU #1) 25 starts the processing to write image data, which is hierarchically encoded, on record medium 24 by using record medium access function section 264 of the second CPU (CPU #2) 26.

Record medium access function section 264 searches an unused empty cluster from the image data area of record medium 24 referring to FAT, and writes the data for one cluster there (step S14). Thereafter, record medium access function section 264 writes end code "FFFF" in the FAT area (entry of FAT) corresponding to the cluster which writes data (step S15). Thereafter, record medium access function section 264 writes file management information (leading cluster number of the file, the file name, the file attribute, the file generating date, and file size, etc.) corresponding to the image data of the writing target in the directory entry (step S16). Since an actual file size has not been fixed yet, the file size (for example, 2 kbyte), which corresponds to one cluster, is written in the directory entry here as file size information. The data recorded in the image data area of record medium 24 becomes possible to read as the file by writing this directory entry.

Next, record medium access function section 264 repeatedly executes processings of steps S18 to S21 until writing all data ends (step S17). That is, first, record medium access function section 264 searches an unused empty cluster from the image data area of record medium 24 referring to FAT, and writes the data for the following one cluster there (step S18). Next, record medium access function section 264 rewrites one end code written in the entry of the cluster in the previous sequence to FAT information, that is, cluster number in which data is written, in step S18 (step S19). Then, after writing end code "FFFF" in the FAT area (entry of FAT) corresponding to the cluster to which data is written in step S18 (step S20), record medium access function section 264 increases the value of file size information on the directory entry for one cluster (step S21).

Thus, after writing the directory entry is performed first to fix the file, the data writing and updating FAT are repeatedly executed by one cluster unit. The final position of the file can be fixed at the time of this writing, since end code "FFFF" is written in the entry of FAT corresponding to the cluster at the time of the data writing. Therefore, even when the writing interruption by dead of the battery etc. is occurred, the data for the cluster, in which data has been recorded, can be normally read as a file.

After data writing for the first one cluster and updating FAT corresponding thereto in steps S14 and S15, the directory entry is written in step S16 in the embodiment. It is not significant even when the data for the first one cluster on the way is left as a file, since it is usual that the valid image file, which can be restored, has the data size more than at least one cluster even if it is image data, which is hierarchically encoded. Of course, writing directory entry may be performed before steps S14 and S15.

(Operation at Shooting: 2)

Next, the second example of the shooting processing operation executed with the electronic camera according to the embodiment will be explained referring to the flow chart of FIG. 6.

Figure 5:
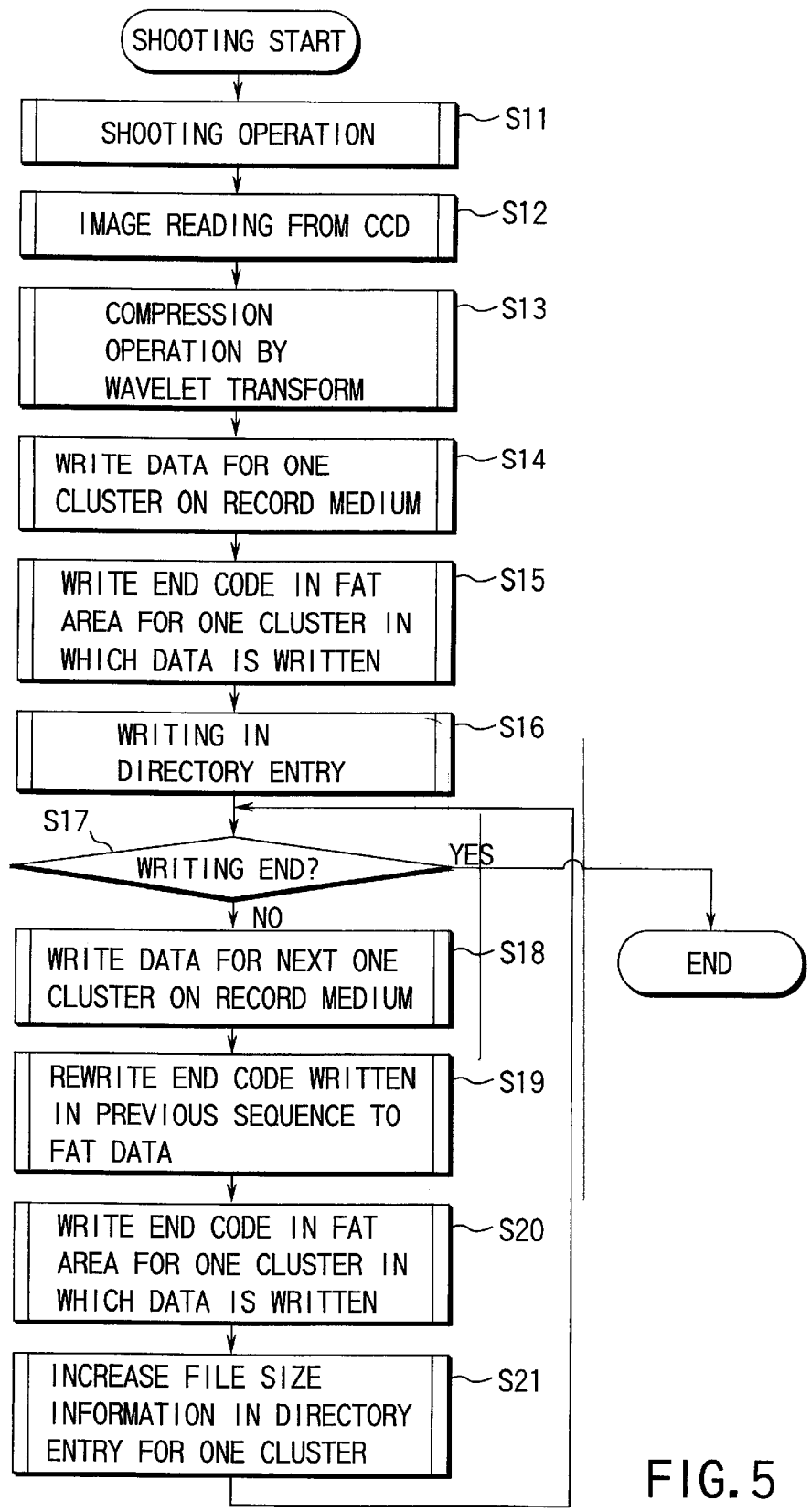
FIG. 5 is a flow chart to explain the first example of the operation at shooting processing which is being executed with the electronic camera according to the embodiment of the present invention.

Only operation corresponding to "Wavelet transform compression mode" is explained in the first example of FIG. 5, but with "DCT compression mode" and "Wavelet transform compression mode" as a record mode, the switching of the following writing sequences is performed by the type of the record mode to be used.

That is, when second release operation is performed by the user, first CPU (CPU #1) 25 controls the exposure operation with CCD area sensor 12 by using imaging circuit 13, shoots the subject image (step S31), and then reads image data from CCD area sensor 12 by using imaging circuit 13 (step S32). This image data is recorded in frame memory 22 by A/D conversion circuit 14 and correction circuit 15. Thereafter, first CPU (CPU #1) 25 judges whether the record mode which is selected beforehand by the operation such as the mode change switch by the user is "DCT compression mode" which uses usual DCT compression (step S33).

When it is "DCT compression mode" (YES in step S33), the irreversible compression data of a usual JPEG form is created with the execution of the image compression processing by DCT, and the performance of the processing of the orthogonal transformation, quantization, and a variable length encoding at every block of image data in frame memory 22 using image compression function section 261 of the second CPU (CPU #2) 26 (step S34) and by first CPU (CPU #1) 25. Thereafter, first CPU (CPU #1) 25 starts processing of writing the image data encoded by a usual JPEG form on record medium 24 by using record medium access function section 264 of the second CPU (CPU #2) 26. That is, record medium access function section 264 repeatedly executes writing all image data by the cluster unit while searching an unused empty cluster from the image data area of record medium 24 referring to FAT (step S35). When writing all image data ends, updating FAT is performed. The value (next cluster number and end code) corresponding to each entry of FAT corresponding to the individual cluster used to write data is written (step S36). Finally, record medium access function section 264 fixes the file by writing file management information corresponding to the written data in the directory entry (step S37). Writing the directory entry is performed like this at the end, since the image data compressed by "DCT compression mode" is the file format in which original image cannot be restored when all data has not been recorded as a complete set. As a result, the data, which cannot be reproduced, can be prevented from remaining as a file even when the data writing operation is interrupted in the process of writing.

On the other hand, when the record mode, which is specified by the user, is "Wavelet transform compression mode" (NO in step S33), after the compression processing by the wavelet transform as well as the processing of step S13 of FIG. 5 is performed (step S38), first CPU (CPU #1) 25 executes "one unit record" operation of fixing the writing data as a file every one cluster unit (step S39–S46) by the same procedure as steps S14 to S21 of FIG. 5 after writing the directory entry first.

(Change of Reduced-Voltage Threshold Level)

Figure 7:
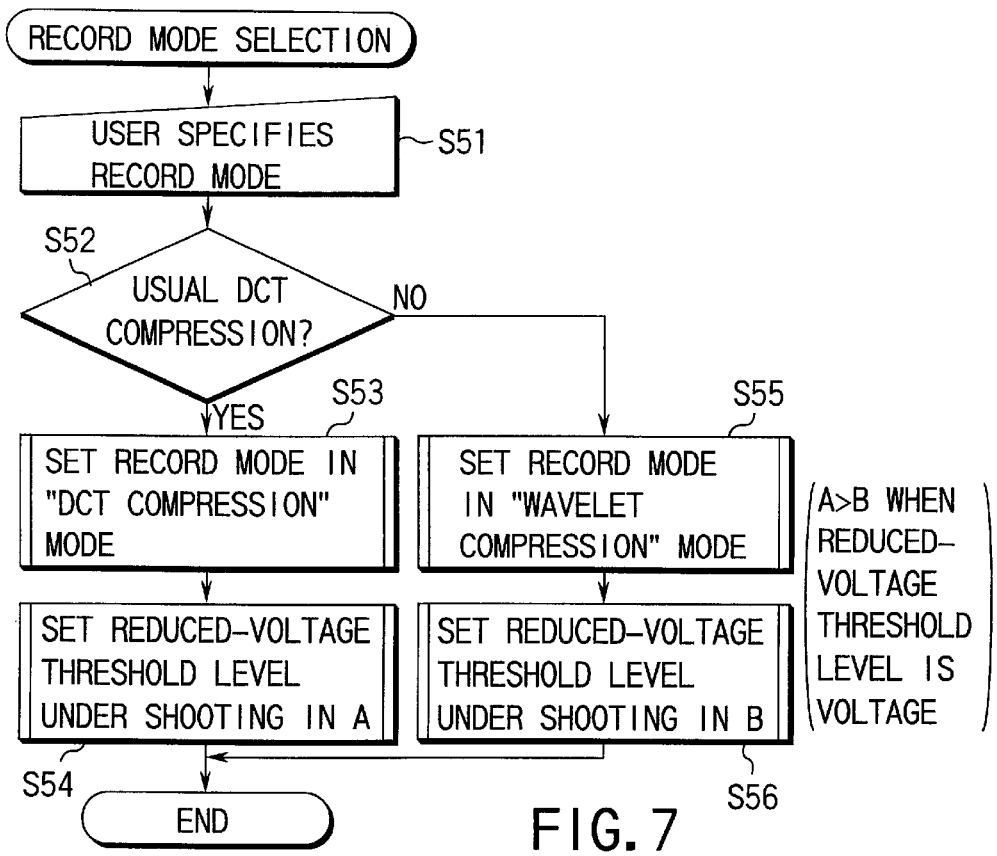
FIG. 7 is a flow chart to explain the change processing operation of reduced-voltage threshold level executed with the electronic camera according to the embodiment of the present invention.

Next, operation to which value of reduced-voltage threshold level is changed according to record mode to be used will be explained referring to flow chart of FIG. 7.

When the user specifies the record mode by operating the mode change switch (step S51), first CPU (CPU #1) 25 judges whether it is an image compression method for the record mode of the user specification to use usual DCT compression (step S52). For example, when the specification of the record mode by the user is performed by compression file type (JPEG/JPEG 2000), it is judged that first CPU (CPU #1) 25 is an image compression method when JPEG is selected to use DCT compression (YES in step S52), and when it is judged that it is an image compression method when JPEG 2000 is selected to use the wavelet transform (NO in step S52). Of course, the user can specify one of "DCT compression mode" and "Wavelet transform compression mode" with the button etc., and the mode may be set in either beforehand.

When the method of the image compression using DCT compression is specified (YES in step S52), after first CPU (CPU #1) 25 sets the record mode in "DCT compression mode" (step S53), reduced-voltage level management function section 252 sets reduced-voltage threshold level to detect whether battery 35 is in the reduced-voltage state at level A decided beforehand (step S54), at shooting. The value of this level A corresponds to minimum necessary, for example, for process shooting remaining capacity.

On the other hand, when the method of the image compression using the wavelet transform is specified (NO in step S52), first CPU (CPU #1) 25 sets reduced-voltage threshold level used by reduced-voltage level management function section 252 when shooting thereafter the record mode is set in "Wavelet transform compression mode" (step S55) at level B (step S54). When reduced-voltage threshold level is indicated by the voltage, it becomes "A>B".

Thus, reduced-voltage threshold level used in "Wavelet transform compression mode" is set lower than that of "DCT compression mode". As a result, since the standard of the detection judgment of the battery consumption is buffered for "DCT compression mode", even when it is expected to become the reduced-voltage state on the shooting processing, it becomes possible to continue shooting and record operation by "Wavelet transform compression mode".

(Change in Reduced-Voltage Detection Method)

Figure 8:
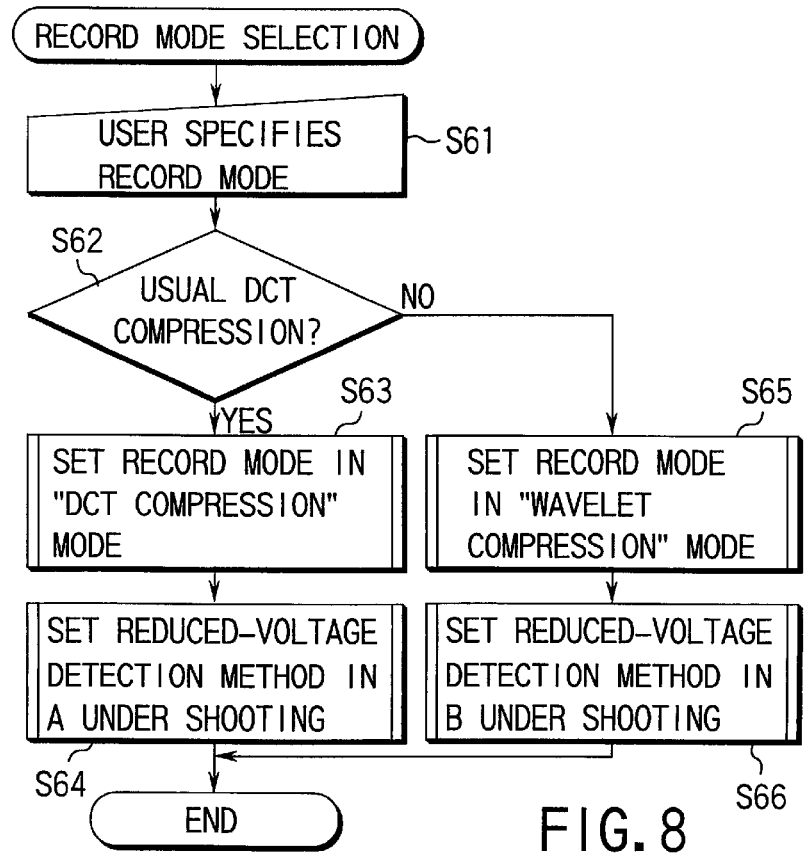
FIG. 8 is a flow chart to explain the change processing operation of the reduced-voltage detection method executed with the electronic camera according to the embodiment of the present invention.

Next, an operation, which changes reduced-voltage detection method according to record mode to be used, will be explained referring to flow chart of FIG. 8.

When the user specifies the record mode by operating the mode change switch (step S61), first CPU (CPU #1) 25 judges whether it is an image compression method for the record mode of the user specification to use usual DCT compression (step S62).

When the method of the image compression using DCT compression is specified (YES in step S62), after setting the record mode in "DCT compression mode" (step S63), first CPU (CPU #1) 25 sets the reduced-voltage detection method under shooting in method A (step S64). Here, the setting of the reduced-voltage detection method specifically means the setting of the execution timing of the reduced-voltage detection and the timing of the execution is set including whether the reduced-voltage is detected while shooting. It is desirable to select the method to detect the reduced-voltage immediately before the start of shooting as reduced-voltage detection method A. The reduced-voltage may be properly detected in reduced-voltage detection method A while shooting.

On the other hand, when the method of the image compression using the wavelet transform is specified (NO in step S62), after setting the record mode in "Wavelet transform compression mode" (step S65), first CPU (CPU #1) 25 sets the reduced-voltage detection method under shooting in method B (step S64). The method, of which the reduced-voltage is not detected, for example, immediately before the start of shooting, and the method of which the reduced-voltage detection are not performed at all etc. may be used as reduced-voltage detection method B. The power supply of the electronic camera is naturally turned off when a battery becomes dead, and the disadvantage is not caused especially for "Wavelet transform compression model".

(Reduced-Voltage Detection Processing Which Uses Different Reduced-Voltage Threshold Level)

Figure 9:
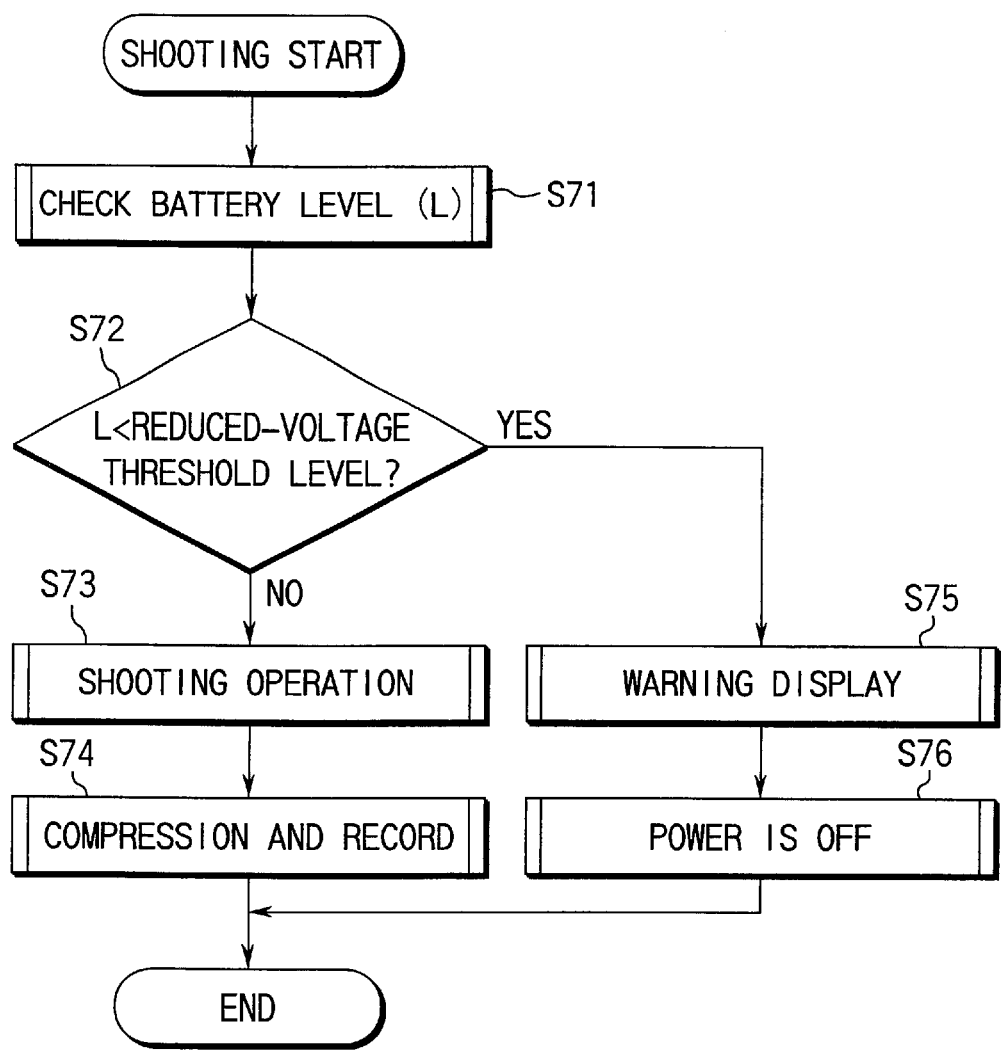
FIG. 9 is a flow chart which shows the first procedure of reduced-voltage detection processing applied to the electronic camera according to the embodiment of the present invention.

Next, the procedure of the reduced-voltage detection processing when reduced-voltage threshold level is changed according to the record mode to be used will be explained referring to FIG. 9.

Figure 6:
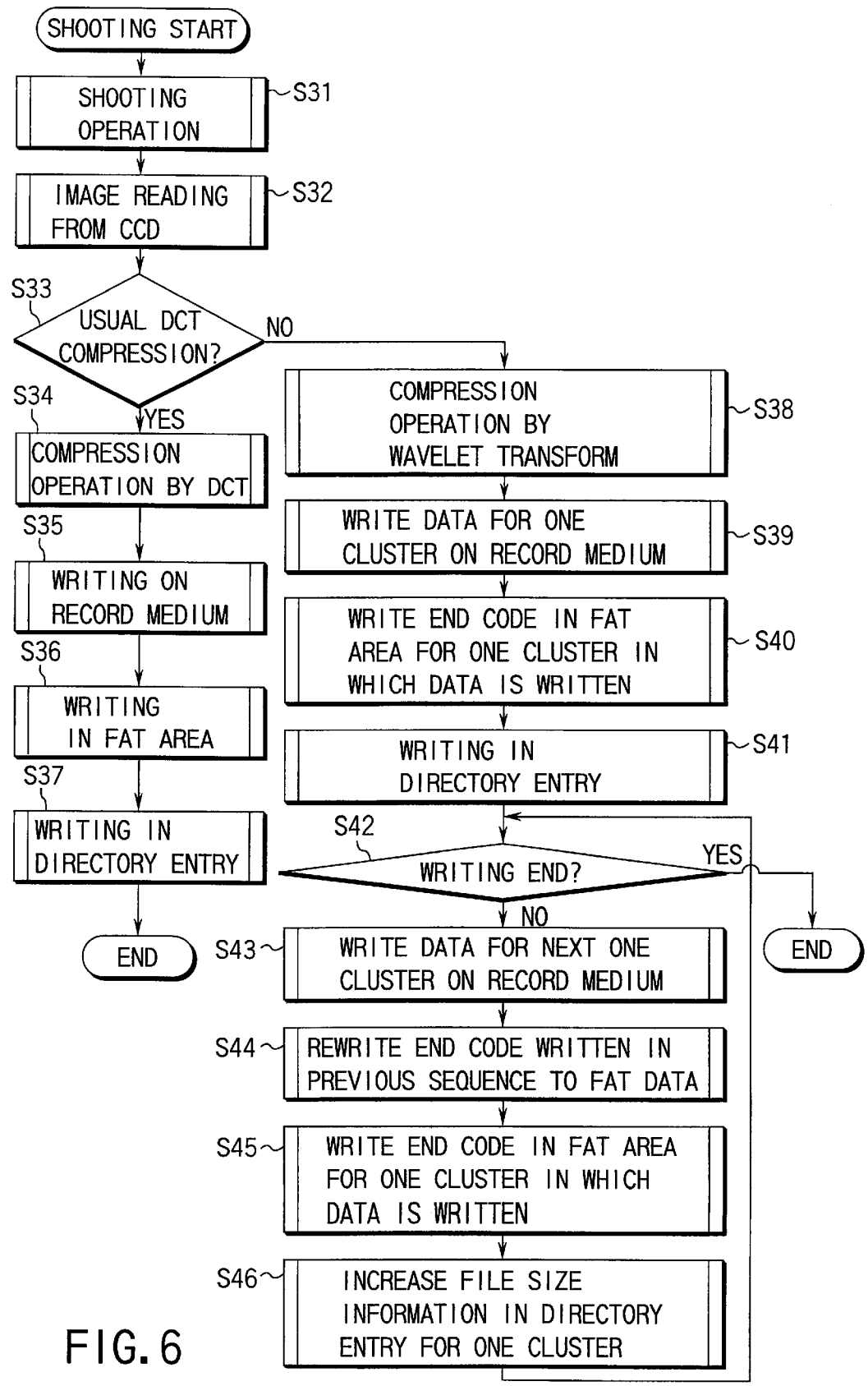
FIG. 6 is a flow chart to explain the second example of the operation at shooting processing which is being executed with the electronic camera according to the embodiment of the present invention.

When second release operation is performed, first CPU (CPU #1) 25 checks remaining capacity level (L) of battery 35 before starting actual shooting processing operation explained by FIG. 5 or FIG. 6 (step S71). And, the remaining capacity level (L) and reduced-voltage threshold level set by FIG. 7 is compared, and it is judged whether it is in the reduced-voltage state if remaining capacity level (L) is lower than reduced-voltage threshold level (step S72). In this case, reduced-voltage threshold level used for the comparison becomes reduced-voltage threshold level A in "Wavelet transform compression mode" and reduced-voltage threshold level B in "DCT compression mode".

When the remaining capacity level (L) is higher than the threshold level of the reduced-voltage (NO in step S72), first CPU (CPU #1) 25 executes the shooting operation and compression/record processing according to the procedure explained by FIG. 6 (steps S73 and S74). In other words, for "DCT compression mode", the execution of the shooting operation and compression/record processing is permitted contingent on reduced-voltage threshold level A or more remaining capacity level (L), while for "Wavelet transform compression mode", when remaining capacity level (L) is equal to or greater than reduced-voltage threshold level B, the execution of the shooting operation, compression, and the record processing is permitted, even if remaining capacity level (L) is less than reduced-voltage threshold level A.

When remaining capacity level (L) is less than reduced-voltage threshold level (YES in step S72), after outputting the warning signal, and displaying the icon which shows the reduced-voltage state and the message on mode display LCD panel 33 (step S75), first CPU (CPU #1) 25 turns off the power of the electronic camera (step S76). In other words, in "DCT compression mode", when remaining capacity level (L) is less than reduced-voltage threshold level A, a warning display and power turn off operation are executed, and in "Wavelet transform compression mode", when remaining capacity level (L) is detected decreasing from reduced-voltage threshold level B, a warning display and power turn off operation are executed.

A reduced-voltage detection method B as mentioned above that does not detect the reduced-voltage at the shooting start can be automatically achieved if reduced-voltage threshold level is assumed to be B="0".

(Reduced-Voltage Detection Processing According to Different Timing)

Figure 10:
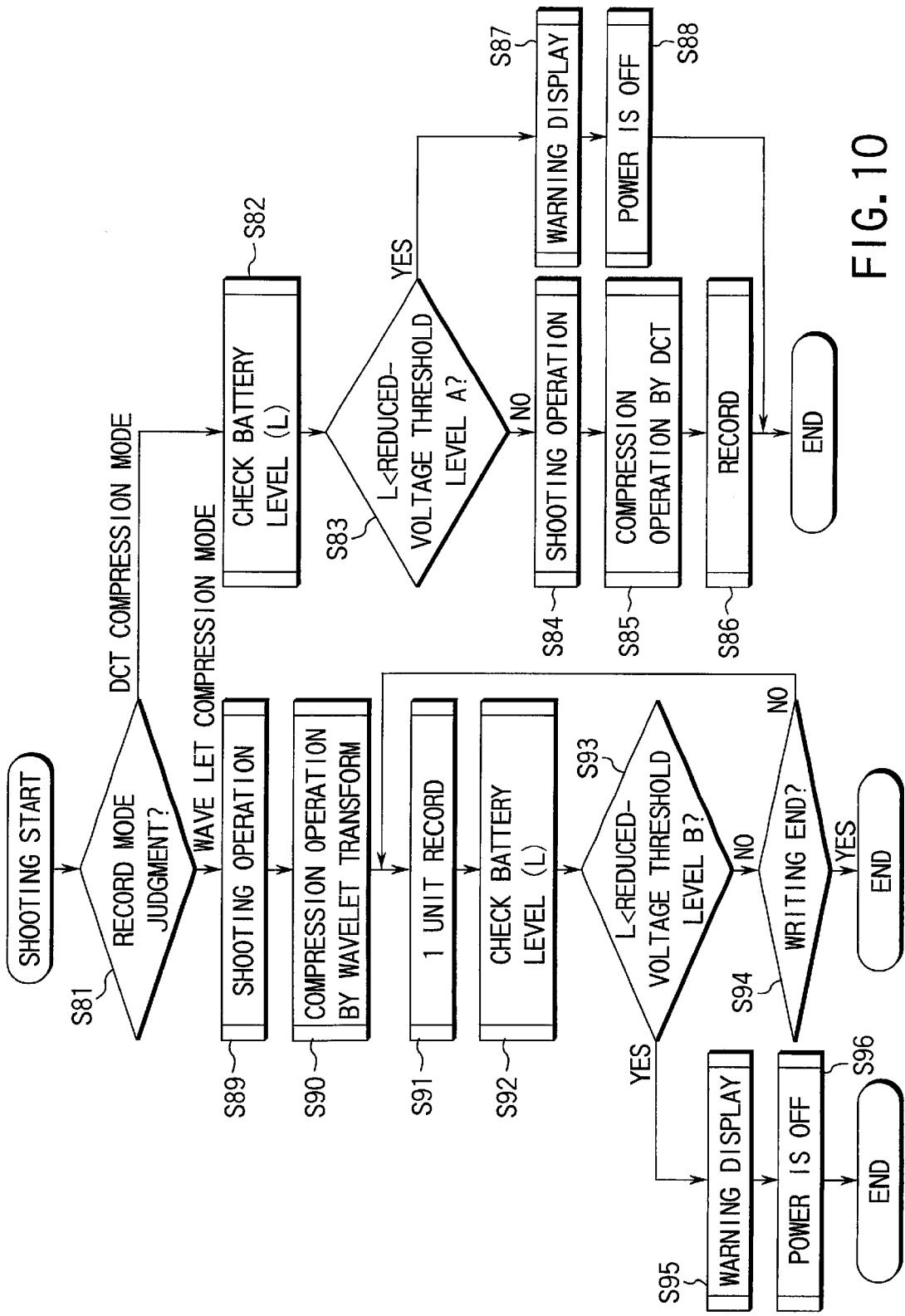
FIG. 10 is a flow chart which shows the second procedure of reduced-voltage detection processing applied to the electronic camera according to the embodiment of the present invention.

Next, a specific processing procedure will be explained referring to the flow chart of FIG. 10 when the reduced-voltage detection timing is changed according to the record mode to be used.

When a second release operation is performed, first CPU (CPU #1) 25 first judges the record mode currently set before starting the actual shooting processing operation explained by FIG. 5 or FIG. 6 (step S81).

If the current mode is "DCT compression mode", first CPU (CPU #1) 25 adopts reduced-voltage detection method A of detecting the reduced-voltage immediately before the start of shooting. In this case, first CPU (CPU #1) 25 checks remaining capacity level (L) of battery 35 (step S82), compares the remaining capacity level (L) and reduced-voltage threshold level A, and judges whether it is in the reduced-voltage state signified by the remaining capacity level (L) being lower than reduced-voltage threshold level A (step S83). When remaining capacity level (L) is equal to the reduced-voltage threshold level A or higher (NO in step S83), first CPU (CPU #1) 25 executes the shooting operation, the compression operation by DCT and the record operation according to the procedure explained by FIG. 6 (steps S84 to S86). On the other hand, when remaining capacity level (L) is less than reduced-voltage threshold level A (YES in step S83), first CPU (CPU #1) 25 outputs the warning signal and, after displaying the icon and the message which show the reduced-voltage state on mode display LCD panel 33 (step S87), turns off the power of the electronic camera (step S88).

When the record mode is "Wavelet transform compression mode", the reduced-voltage detection check immediately before the start of shooting is omitted, first CPU (CPU #1) 25 performs the shooting operation which uses CCD area sensor 12 (step S89) at once, and then, starts the control of the image compression processing by the wavelet transform (step S90). After this, "One unit record" operation of fixing the writing data as a file every one cluster unit is executed repeatedly by the cluster unit after the directory entry is written (steps S91 to S94). First CPU (CPU #1) 25 checks remaining capacity level (L) of battery 35 every time the data writing and the FAT updating for one cluster are performed (step S92). Then, it is judged whether the battery is in the reduced-voltage state if remaining capacity level (L) is lower than reduced-voltage threshold level B by comparing the remaining capacity level (L) and reduced-voltage threshold level B (step S93).

If remaining capacity level (L) is equal to reduced-voltage threshold level B or higher (NO in step S93), the execution of one unit record processing for the following one cluster (step S91) is permitted.

On the other hand, when remaining capacity level (L) decreases lower than reduced-voltage threshold level B (YES in step S93), first CPU (CPU #1) 25 outputs the warning signal and, after displaying the icon and the message which show the reduced-voltage state on mode display LCD panel 33 (step S95), turns off the power of the electronic camera (step S96).

As mentioned above, in this embodiment, when image data, which is hierarchically encoded, is recorded by the image compression method of using the wavelet transform, after the directory entry is written, "One unit record" operation of fixing the writing data as a file every one cluster unit is performed. As a result, even if the writing operation is interrupted while writing by the death of the battery, it becomes possible to leave the data, which has been recorded, as a file, and becomes possible to restore the original image using only the recorded data though the picture quality lowers.

It is most desirable that the "One unit record" operation is performed in every one cluster unit, but the same or a similar effect can be achieved even if the record operation is performed in each predetermined unit of data based on the cluster, for example, such as two clusters units, three clusters units, and four clusters units, . . . , etc. although, in such embodiments the recorded data, which may become useless in the event of an interruption, increases a little.

The same effect as discussed with respect to the electronic camera in the embodiments can be achieved in other electronic equipment by adopting a writing procedure of these particular embodiments, if the electronic equipment is an equipment driven by the battery. Since the writing operation might be interrupted before completion by not only the death of the battery but also by some other error occurrence, the effect in which the data that has been written before the error has occurred can be normally read is achieved. This advantageous effect applies even to equipment other than the battery driven equipment.

Since the execution control of the writing procedure of this embodiment is performed by the computer program, it becomes possible to easily achieve the same effect as this embodiment by recording this computer program in a computer readable record medium, and introducing it into the built-in microcomputer of a computer and an electronic equipment through the record medium.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image recording device, which records image data on a record medium, comprising:

first encoding means adapted to hierarchically encode, using a hierarchical encoding method, the image data to be recorded;

second encoding means adapted to encode the image data to be recorded using a second encoding method which is different from the hierarchical encoding method; and record means adapted to record the image data encoded by either said first encoding means or said second encoding means on said record medium, wherein if the image data was encoded by the first encoding means, said record means (i) records a portion of the image data, in association with a corresponding cluster of a predetermined unit of the record medium, (ii) fixes any recorded portions as a file and (iii) repeats the acts of recording and fixing, and wherein if the image data was encoded by the second encoding means, then said record means records all of the encoded image data and then fixes the recorded encoded image data as a file.

2. The image recording device according to claim 1, further comprising:

reduced-voltage state detection means to detect whether a battery used as a power supply of said image recording device is in a consumption state based on a remaining capacity of the battery and a predetermined threshold level, and to output a predetermined warning signal when said battery is detected being consumed; and threshold level setting means to set a value of said threshold level according to whether the image data to be recorded is encoded by using either of encoding means of said first encoding means and said second encoding means.

3. The device of claim 1 further comprising means to shoot a subject image.

4. The device of claim 2 further comprising means to shoot a subject image.

5. An image recording device, which records image data on a record medium, comprising:

first encoding means to hierarchically encode the image data to be recorded;

second encoding means to encode the image data to be recorded by other encoding methods except a hierarchical encoding method;

record means to record the image data encoded by said first encoding means or said second encoding means on said record medium, wherein said record means repeatedly records the image data, which is hierarchically encoded, on said record medium while fixing it for each cluster of a predetermined unit as a file when image data, which is hierarchically encoded, by said first encoding means is recorded on said record medium, and records on said record medium after fixing the entire image data encoded by said second encoding means as a file when the image data encoded by said second encoding means is recorded on said record medium;

reduced-voltage state detection means to detect whether a battery used as a power supply of said image recording device is in a consumption state based on a remaining capacity of said battery and a predetermined threshold level, and to output a predetermined warning signal when said battery is detected being consumed; and threshold level setting means to set a value of said threshold level according to whether the image data to be recorded is encoded by using either of encoding means of said first encoding means and said second encoding means, wherein said threshold level setting means sets a threshold level when image data is encoded by said first encoding means lower than a threshold level when image data is encoded by said second encoding means.

6. The device of claim 5 further comprising means to shoot a subject image.

7. An image recording device, which records image data on a record medium, comprising:

first encoding means to hierarchically encode the image data to be recorded;

second encoding means to encode the image data to be recorded by other encoding methods except a hierarchical encoding method;

record means to record the image data encoded by said first encoding means or said second encoding means on said record medium, wherein said record means repeatedly records the image data, which is hierarchically encoded, on said record medium while fixing it for each cluster of a predetermined unit as a file when image data, which is hierarchically encoded, by said first encoding means is recorded on said record medium, and records on said record medium after fixing the entire image data encoded by said second encoding means as a file when the image data encoded by said second encoding means is recorded on said record medium;

reduced-voltage state detection means to detect whether a battery used as a power supply of said image recording device is consumed based on the remaining capacity of the battery and to output a predetermined warning signal when said battery is detected being consumed; and detection timing setting means to set an execution timing of a detection operation of said reduced-voltage state detection means according to whether image data to be recorded is encoded by using either of encoding means of said first and second encoding means.

8. The image recording device according to claim 7, wherein said detection timing setting means makes a setting in which the reduced-voltage state is not detected when encoding is performed by said first encoding means.

9. The image recording device according to claim 7, wherein said detection timing setting means sets a detection timing of the reduced-voltage state before encoding by said second encoding means when encoding is performed by said second encoding means.

10. The image recording device according to claim 9, wherein said detection timing setting means sets the detection timing in the reduced-voltage state at predetermined intervals until encoding ends when encoding is performed by said second encoding means.

11. The device of claim 7 further comprising means to shoot a subject image.

12. The device of claim 8 further comprising means to shoot a subject image.

13. The device of claim 9 further comprising means to shoot a subject image.

14. The device of claim 10 further comprising
means to shoot a subject image.

15. An image recording device comprising:

a first encoder configured to hierarchically encode image data to be recorded according to a hierarchical encoding method;

a second encoder configured to encode the image data to be recorded using a second encoding method which is different from the hierarchical encoding method; and a recorder capable of recording the image data encoded by the first encoder using a first recording method and capable of recording the image data encoded by the second encoder using a second recording method, wherein when said recorder uses the first recording method said recorder (i) records a portion of the image data in association with a corresponding cluster of a predetermined unit of the record medium (ii) fixes any recorded portions as a file and (iii) repeats the acts of recording and fixing, wherein when said recorder uses the second recording method said recorder records all of the encoded image data and then fixes the recorded encoded image data as a file, and wherein the recorder operates using one of said first and second recording methods in accordance with an instruction of a selector.

16. An image recording device for recording hierarchically encoded image data on a record medium, wherein the hierarchically encoded image data comprises at least two sets of encoded image data corresponding to different frequencies, the image recording device comprising:

means for recording one by one the sets of encoded image data on the record medium in a sequence such that a set of encoded image data corresponding to a first frequency is recorded prior to a set of encoded image corresponding to a second frequency, wherein the first frequency is lower than the second frequency; and record means adapted to record the hierarchically encoded image data on said record medium, wherein said record means (i) records a portion of the encoded image data in association with a corresponding cluster of a predetermined unit of the record medium (ii) fixes any recorded portions as a file and (iii) repeats the acts of recording and fixing.

17. An electronic camera apparatus comprising:

photographing means which photographs a subject image by using an imaging device;

encoding means which hierarchically encodes image data obtained by the photographing, wherein the hierarchically encoded image data comprises at least two sets of encoded image data having different frequencies; and an image recording device which records the hierarchically encoded data on a recording medium, the image recording device comprising:

means for recording one by one the sets of encoded image data on the record medium in a sequence such that a set of encoded image data corresponding to a first frequency is recorded prior to a set of encoded image corresponding to a second frequency, wherein the first frequency is lower than the second frequency; and record means adapted to record the hierarchically encoded image data on said record medium, wherein said record means (i) records a portion of the encoded image data in association with a corresponding cluster of a predetermined unit of the record medium (ii) fixes any recorded portions as a file and (iii) repeats the acts of recording and fixing.

18. An image recording device for recording encoded image data on a record medium, comprising:

first encoding means adapted for hierarchically encoding, using a hierarchical encoding method, the image data to be recorded;

second encoding means adapted for encoding the image data to be recorded using a second encoding method which is different from the hierarchical encoding method; and record means adapted for recording the image data encoded by either said first encoding means or said second encoding means on said record medium, wherein if the image data was encoded by the first encoding means, said record means (i) records a portion of the encoded image data in association with a corresponding cluster of a predetermined unit of the record medium (ii) fixes any recorded portions as a file and (iii) repeats the acts of recording and fixing, and wherein if the image data was encoded by the second encoding means, then said record means records all of the encoded image data and then fixes the recorded encoded image data as a file.

19. The image recording device according to claim 18, further comprising:

reduced-voltage state detection means for detecting whether a battery, used as a power supply of said image recording device, is in a consumption state based on a remaining capacity of the battery and a predetermined threshold level and for outputting a predetermined warning signal when said battery is detected as being consumed; and means for changing a value used as said threshold level according to whether the encoded image data to be recorded is encoded by the first encoding means or by the second encoding means.

20. The image encoding and recording device according to claim 18, further comprising:

reduced-voltage state detection means for detecting whether a battery, used as a power supply of said image recording device, is in a consumption state based on a remaining capacity of the battery and a predetermined threshold level and for outputting a predetermined warning signal when said battery is detected as being consumed; and means for changing an execution timing of a detection operation of said reduced-state detection means according to whether the encoded image data to be recorded is encoded by the first encoding means or by the second encoding means.

21. An electronic camera apparatus comprising:

an imaging device used for photographing a subject image and obtaining image data; and an image recording device for encoding the image data obtained by the photographing and recording the encoded image data on a record medium, said image recording device comprising:

first encoding means adapted for hierarchically encoding, using a hierarchical encoding method, the image data to be recorded;

second encoding means adapted for encoding the image data to be recorded using a second encoding method which is different from the hierarchical encoding method; and record means adapted for recording the image data encoded by either said first encoding means or said second encoding means on said record medium, wherein if the image data was encoded by the first encoding means, said record means (i) records a portion of the encoded image data in association with a corresponding cluster of a predetermined unit of the record medium (ii) fixes any recorded portions as a file and (iii) repeats the acts of recording and fixing, and wherein if the image data was encoded by the second encoding means, then said record means records all of the encoded image data and then fixes the recorded encoded image data as a file.

22. An electronic camera apparatus comprising:

an imaging device used to photograph a subject image and output image data; and an image recording device for encoding the image data obtained by the photographing and recording the encoded image data on a record medium, said image recording device comprising:

first encoding means adapted for hierarchically encoding, using a hierarchical encoding method, the image data to be recorded;

second encoding means adapted for encoding the image data to be recorded using a second encoding method which is different from the hierarchical encoding method;

record means adapted for recording the image data encoded by either said first encoding means or said second encoding means on said record medium, wherein if the image data was encoded by the first encoding means, said record means (i) records a portion of the encoded image data in association with a corresponding cluster of a predetermined unit of the record medium (ii) fixes any recorded portions as a file and (iii) repeats the acts of recording and fixing, and wherein if the image data was encoded by the second encoding means, then said record means records all of the encoded image data and then fixes the recorded encoded image data as a file;

reduced-voltage state detection means for detecting whether a battery, used as a power supply of said image recording device, is in a consumption state based on a remaining capacity of the battery and a predetermined threshold level and for outputting a predetermined warning signal when said battery is detected as being consumed; and means for changing a value used as said threshold level according to whether the encoded image data to be recorded is encoded by the first encoding means or by the second encoding means.

23. An electronic camera apparatus comprising:

an imaging device used to photograph a subject image and output image data; and an image recording device for encoding the image data obtained by the photographing and recording the encoded image data on a record medium, said image recording device comprising:

first encoding means adapted for hierarchically encoding, using a hierarchical encoding method, the image data to be recorded;

second encoding means adapted for encoding the image data to be recorded using a second encoding method which is different from the hierarchical encoding method; and record means adapted for recording the image data encoded by either said first encoding means or said second encoding means on said record medium, wherein if the image data was encoded by the first encoding means, said record means (i) records a portion of the encoded image data in association with a corresponding cluster of a predetermined unit of the record medium (ii) fixes any recorded portions as a file and (iii) repeats the acts of recording and fixing, and wherein if the image data was encoded by the second encoding means, then said record means records all of the encoded image data and then fixes the recorded encoded image data as a file;

reduced-voltage state detection means for detecting whether a battery, used as a power supply of said image encoding and recording device, is in a consumption state based on a remaining capacity of the battery and a predetermined threshold level and for outputting a predetermined warning signal when said battery is detected as being consumed; and means for changing an execution timing of a detection operation of said reduced-state detection means according to whether the encoded image data to be recorded is encoded by the first encoding means or by the second encoding means.

24. An image encoding and recording device which encodes image data obtaining encoded image data and records the encoded image data on a record medium, said image encoding and recording device comprising:

first encoding means to encode, using a hierarchical encoding method, the image data to be recorded;

second encoding means to encode, using a non-hierarchical encoding method, the image data to be recorded;

record means to record the encoded image data on said record medium, wherein said record means records a distinct portion of said encoded data in a memory area of said record medium associated with a cluster of a predetermined size, updates the file management information to allow the stored encoded image data to be retrieved as a file, repeats the recording and updating operation for each of additional distinct portions of said encoded image data, when said encoded image data was obtained from said first encoding means, and wherein said record means records the encoded image data in its entirety and then updates file management information to allow the stored encoded data to be retrieved as a file, when said encoded image data was obtained, from said second encoding means.

25. The device of claim 24 wherein said cluster is a minimum management unit to manage logically a physical memory area.

26. The device of claim 25, wherein said predetermined cluster size remains constant as the recording and updating proceeds on the hierarchically encoded data corresponding to an image.

27. The device of claim 24, wherein the file management system uses a file allocation table.

28. The device of claim 24, wherein the hierarchically encoded data is subdivided into hierarchical priority blocks of encoded data which are distinct from clusters.

29. The device of claim 28, wherein the hierarchical priority blocks define an order of writing hierarchical encoded data.

30. The device of claim 29, wherein at least two of the hierarchical priority blocks are different sizes.

31. The device of claim 28, wherein multiple clusters may correspond to a single hierarchical priority block.

32. The device of claim 28, wherein a cluster may correspond to portions of two hierarchical priority blocks.

33. The device of claim 24, further comprising a means to shoot a subject image and obtain image data.

34. The device of claim 33, wherein the device is an electronic camera.

* * * * *